United States Patent [19]

Ljusberg-Wahren

[11] Patent Number: 4,634,450
[45] Date of Patent: Jan. 6, 1987

[54] COAL-WATER DISPERSION

[75] Inventor: Helena Ljusberg-Wahren, Söderhamn, Sweden

[73] Assignees: Bergvik Kemi AB; Fluidcarbon International AB, both of Sweden

[21] Appl. No.: 627,585

[22] Filed: Jul. 3, 1984

[30] Foreign Application Priority Data

Jul. 6, 1983 [SE] Sweden .................................. 8303863
Apr. 18, 1984 [KR] Rep. of Korea ....................... 84-2036

[51] Int. Cl.⁴ ............................ B01J 13/00; C10L 1/32
[52] U.S. Cl. ....................,................... 44/51; 252/311; 252/356
[58] Field of Search ..................... 252/311, 356; 44/51; 560/80, 91, 119, 117

[56] References Cited

U.S. PATENT DOCUMENTS

| | | | |
|---|---|---|---|
| 2,091,887 | 9/1937 | Schanzle et al. | 167/90 |
| 2,269,529 | 1/1942 | Goldsmith et al. | 252/310 |
| 2,491,478 | 12/1949 | Cook et al. | 260/404 |
| 2,528,136 | 10/1950 | Goldstein et al. | 252/356 |
| 2,593,413 | 4/1952 | Cook et al. | 260/404 |
| 2,596,985 | 5/1952 | Cook et al. | 252/8.75 |
| 2,599,391 | 6/1952 | Katzman | 260/401 |
| 2,603,571 | 7/1952 | Castellano | 106/123 |
| 2,640,037 | 5/1953 | Parry et al. | 260/42 |
| 2,667,478 | 1/1954 | Schwartz | 260/211 |
| 2,752,262 | 6/1956 | Dunlap | 106/123 |
| 3,057,890 | 10/1962 | DeGroote | 560/91 X |
| 3,248,349 | 4/1966 | Smehat | 260/2.5 |
| 3,282,970 | 11/1966 | Riggs, Jr. | 260/404.5 |
| 3,379,708 | 4/1968 | Peacock | 260/97.5 |
| 3,431,064 | 3/1969 | Fox | 252/356 X |
| 3,451,936 | 6/1969 | Nobile | 252/152 |
| 3,632,822 | 1/1972 | Conroy | 260/407 |
| 4,265,782 | 5/1981 | Armstrong et al. | 252/DIG. 13 X |
| 4,358,293 | 11/1982 | Mark | 44/51 |
| 4,360,615 | 11/1982 | Wang et al. | 524/9 |

FOREIGN PATENT DOCUMENTS 1280259 7/1972 United Kingdom .

Primary Examiner—Richard D. Lovering
Attorney, Agent, or Firm—Pollock, Vande Sande & Priddy

[57] ABSTRACT

A coal-water dispersion comprising coal particles dispersed in water and a dispersing agent comprising polymerized fatty acids, polymerized rosin acids and/or polymerized fatty or rosin acid derivatives which have been partially esterified with a polyalkylene glycol or monoester or monoether thereof, having a residual acid value higher than 3.

11 Claims, No Drawings

COAL-WATER DISPERSION

The present invention relates to a dispersing agent for solid hydrophobic particles in water, and more specifically use thereof for dispersing coal particles in water. The dispersing agent of the invention is based on substances comprising fatty acids, rosin acids, and/or fatty or rosin acid derivatives, such as crude tall oil.

Crude tall oil is obtained as a by-product in the kraft or sulfate pulping process. The black liquor separated from the pulp contains sulfate soap. By separation of this soap and splitting thereof by acidification crude tall oil is formed. The splitting normally is effected with sulphuric acid. There are, however, other reactions than splitting of sodium soaps of fatty and rosin acids taking place e.g. esterification and sulphonation. This is apparent from the fact that tall oil split with sulphuric acid will have other characteristics than tall oil being split with weaker acids. The expression crude tall oil in this connection also comprises the extractive material produced in the sulfite pulping process.

Crude tall oil consists of fatty acids, rosin acids and neutral substances. The fatty acids are a mixture of oleic acid and linoleic acid comprising smaller amounts of other saturated and polyunsaturated acids. The rosin acids are diterpenes with a cyclic, rigid, hydrophobic part. The neutral part of the crude tall oil mainly consists of polycyclic hydrocarbons, sterols and other high molecular alcohols such as $\beta$-sitosterol, betulin and long chain fatty alcohols. The amount of neutral part depends on the type of wood used, pine giving about 10% neutral substance and birch just below 30% neutral substance of the extractive material.

The main part of the crude tall oil being produced is further refined by fractionated distillation, tall oil head, tall oil fatty acid, tall oil rosin acid and pitch being obtained as different fractions. The economy of this process depends on the composition of the tall oil. Thus in turn depends on the composition of the wood furnished to the sulphate pulping industry. Some crude tall oils have a composition that makes them economically unfeasable for distillation. The increased proportion of birch and the decreased proportion of pine during the last years have resulted in that tall oil of the kind not being distillable has become more common. The producers have difficulties in selling this crude tall oil and it is in some cases burnt.

The composition of distillable crude tall oil normally is within the following limits:
  Acid value: 120–170
  Fatty acid content: 32–55%
  Rosin content: 11–50%
  Unsaponifiable: 5–24%

A typical Scandinavian crude tall oil has the following values:
  Acid value: 143
  Rosin content: 30%
  Unsaponifiable: 15%

Variations in the tall oil depend on which trees are used in the pulp process as well as where they have been growing. A pulp digested on birch alone give about 70% fatty acids and 30% unsaponifiable. Rosin acids only exist in coniferous trees.

Uncharged particles of a colloidal size, that is smaller than about 0.1 $\mu$m, as well as larger particles, so-called coarse disperse particles, have a tendency to agglomerate in solution forming particle aggregates. This can be prevented in accordance with known principles, i.e. by sterical or electrostatical stabilization of the particles. In sterical stabilization by means of polymers the polymer molecule is absorbed to the particle surface. It has long been known that the best polymers for this purpose should have one part having a high affinity to the dispersion medium and another part being attracted to the particle. It is also known that the addition of substances having ionic groups, such as polyelectrolytes, increases the stability of the dispersion. For larger particles, which settle under the influence of gravity, a stabilization against sedimentation is also required.

In U.S. Pat. No. 4,358,293 there is thus disclosed a dispersion of coal particles in water, wherein as dispersing agent is used a non-ionic surfactant polyalkylene oxide compound having a hydrophobic portion and a hydrophilic portion, and wherein the hydrophilic portion comprises at least 100 units of ethylene oxide.

It also known from the SE-patent application No. 8104645-0 to disperse coal particles in water by means of several different additives, such as a tenside which is absorbed to the particle surface causing repulsion between the particles, and interacting hydrophilic polymers which are supposed to provide sterical hindrance.

SE-patent application No. 8301502-4 finally, describes a dispersing agent for coal particles in water being obtained by esterification of tall oil pitch with polyalkylene glycol.

Tall oil fatty acids and tall oil rosin acids as well, can be reacted with for instance polyethylene glycol to form products having dispersing characteristics. A partial esterification of crude tall oil with polyethylene glycol or polyethylene glycol derivatives during heating will give a dispersing agent for solid hydrophobic particles in water. This substance has substantially better characteristics compared to a tall oil fatty acid esterified with polyethylene glycol during the same conditions as to the ability to produce a particle dispersion having a high solid proportion and a liquid flow.

It has now been found that an improved dispersing agent for solid particles in water is obtained if the viscosity of the crude oil is increased, that is a molecular enlargement is achieved before the esterification. A polymerization of the different components of crude tall oil, such as fatty acids, rosin acids and fatty or rosin acid derivates, also gives products with enlarged molecules, which can be used to prepare improved dispersing agents.

The fatty acid could be saturated or unsaturated and should have at least 10 carbon atoms, preferably at least 16 carbon atoms. As examples of fatty acids can be mentioned palmitic acid, stearic acid, oleic acid, linoleic acid, linolenic acid, pinolenic acid.

The dispersing agent of the invention comprises polymerized fatty acids, polymerized rosin acids and/or optionally polymerized fatty or rosin acid derivatives, which have been partially esterified with a polyalkylene glycol or a monoester or monoether thereof and has a residual acid value higher than 3.

Polymerized fatty acid refers to a dimer, trimer or oligomer product obtained by polymerizing one or several different fatty acids. The dimer fatty acid will produce a well performing dispersing agent.

The optionally polymerized fatty or rosin acid derivative comprises for example a fatty acid polymerized with a rosin acid or any other compound and a polymerized mixture of different fatty acids, rosin acids and/or higher alcohols or other neutral substances.

A preferred dispersing agent of the invention is crude tall oil, which has been polymerized so that its viscosity at 50° C. has been at least doubled, and partially esterified with a polyalkylene glycol or monoester or monoether thereof, having a residual acid value higher than 3.

An increase of the average molecular weight of the crude tall oil or the components thereof effect the properties as dispersing agents after the partial esterification with the polyethylene glycol. The reason for this is that a just large enough hydrophobic unit to which different types of hydrophilic groups as acid and hydroxyl are linked is desirable. To the carboxylic acid groups polyethylene glycol chains are added. The molecule so formed is to have adequate characteristics as to the interaction with water to be able to serve as a dispersing agent, that is a nominally water insoluble part adsorbing to the hydrophobic surface and a nominally water soluble part strongly interacting with water. The molecule so adsorbed on the particle will thus give a sterical protection by means of the polyethylene-glycol chains as well as an electrostatical one by means of the groups being charged in neutral pH. These two protective mechanisms counteract a particle aggregation due to the attractive forces (Van de Waals) between the particles. The size of the hydrophobic as well as of the hydrophilic part is of importance for the extent of well performance of a dispersing agent. It is known form the literature that the ability of a polyethylene oxide chain to give sterical protection depends on its length. The size and the type of hydrophobic part also effect the adsorption of the dispersing agent from the water solution to the particle surface.

An increase of the average molecular weight is reflected in an increased viscosity—there is, however, no linear connection.

It has been found that a viscosity of the crude tall oil at 50° C. above 1000 mPa.s, determined on an Emila rotation viscosimeter (Reciprotor A/S, Denmark) gives an improved dispersing ability.

It is also of importance that the residual acid value of the product obtained is higher than 3, that is that there are a sufficent number of free acid groups left after the reaction, as these groups contribute to the electrostatic repulsion between the particles to be dispersed. Products having a residual acid value lower than and about 3 have clearly inferior properties compared to corresponding products having a higher residual acid value. A residual acid value within the range 5-12 seems to be adequate.

Crude tall oil can be polymerized in accordance with several known processes. In heating crude tall oil, optionally in the presence of catalysts, reactions take place which among other things bring about an increase of the viscosity. An example of the chemical reactions taking place is esterification, that is the reaction of the acid groups with alcohols, which are both present in the crude tall oil. This reaction is catalyzed by strong acids such as sulphuric acid, residues of which are present in the crude tall oil from the splitting step. Crude tall oil has a hydroxyl value of about 25 due to the free alcohols, and these hydroxyl groups are in principle removed by reaction during the polymerization.

Diels- Alder reactions between molecules having isolated and conjugated double bonds also take place. The proportion of conjugated double bonds is of critical importance for the amount of product being formed by the Diels-Alder reaction. The conjugation of isolated double bonds is catalyzed by anthraquinone, which is present in the crude tall oil when this chemical has been added to the digester in the sulphate pulping industry. According to an embodiment of the invention the dispersing agent is based on fatty or rosin acid derivatives, which are derived from fatty or rosin acids containing conjugated double bonds which have been reacted according to Diels-Alder in order to increase the number of carboxylic acid groups.

Oxidative polymerization also takes place in crude tall oil. This refers to such reactions between oxygen and olefines resulting in the formation of a high concentration of free radicals. This type of polymerization of crude tall oil is consequently facilitated by supplying air.

Boron trifluoride is a strong Lewis acid. From literature $BF_3$ is a known polymerization reagent for compounds comprising double bonds, for instance vegetable and animal oils. Terpenes too, as $\alpha$- and $\beta$-pinene, dipentine, squalene can be polymerized with $BF_3$. The reaction between fatty and rosin acids respectively and $BF_3$ is known from literature. Reactions with alcohols can also be accomplished by means of $BF_3$.

The viscosity of crude tall oil can also be increased by adding multifunctional alcohol and acid during heating.

According to another embodiment of the invention the dispersing agent is based on fatty or rosin acid derivatives derived from fatty or rosin acids which have been reacted with a multifunctional alcohol and/or carboxylic acid.

Suitable polybasic acids are chiefly maleic anhydride, phthalic anhydride, isophthalic anhydride, trimellitic acid.

Suitable polyhydric alcohols are principally ethylene glycol, diethylene glycol, glycerol, trimethylol propane, ditrimethylol propane, monopentaerythritole, dipentaerythritol, neopentyl glycol. In addition substances with hydroxylic groups as well as carboxylic groups can be used, such as dimethylol propionic acid.

A traditional way to increase the molecular weight is standoil boiling. Treatment with boric acid also polymerizes crude tall oil. Boric acid is known from the literature to give pyrone rings when reacted with fatty acid.

An improved dispersing agent of the invention is obtained if the amount of large molecules is increased by distillation of the polymerized crude tall oil before the partial esterification.

A residue obtained in distilling fatty acids from fats or oils of animal or vegetable origin can also be partially esterified with a polyalkylene glycol or a monoester or monoether thereof to produce a dispersing agent with improved properties.

A dispersing agent of the invention is obtained by reacting polymerized crude tall oil and polyalkyleneglycol or a monoester or monoether thereof. The polyalkylene glycol is mainly composed by ethylene-oxide units, as it is essential that it has a hydrophilic character. As examples of monoesters thereof can be mentioned esters of carboxylic acids of the type R—COOH, wherein R is a hydrocarbon residue of 1–19 carbon atoms, preferably 1–4 carbon atoms, such as acetic acid, propionic acid, butyric acid. Monoethers of polyalkylene glycol are alkyl ethers, wherein the alkyl group can have 1-20 carbon atoms, preferably 1-5 carbon atoms. As examples can be mentioned monoethers of polyethylene glycol of the formula R—O—$(CH_2CH_2O)_n$—$CH_2$—$CH_2OH$, wherein R is alkyl with 1-5 carbon atoms and n is a number >12. For economical reasons polyethylene glycol is, however, preferred.

For the steric hindrance effect to be pronounced it is necessary that the polyalkylene glycol has a sufficiently high molecular weight, 600 at the lowest. Conveniently the molecular weight is between 4000 and 10000, but also higher values can be applicable.

For the preparation of a dispersing agent of the invention polymerized tall oil and polyalkylene glycol or a monoester or monoether thereof, are reacted in a ratio of 10:90 to 90:10, preferably 30:70 to 70:30, by mixing and heating during a period of time being sufficient for the acid value to be reduced by at least 2 units. A larger amount of tall oil will give a less expensive product and a larger amount of polyalkylene glycol will give a more efficient product.

If the polyethylene glycol and crude tall oil are used as reactants the reaction can be proceeded at 200° to 300° C. for 1–12 h at atmospheric pressure, preferably 230°–280° C., depending on the molecular weight and the residual acid value desired.

The dispersing agent of the invention can be used for dispersing coal particles in water for the preparation of a so called coal-water slurry. Many ways to prepare and stabilize coal-water slurries have been suggested. The reason for this is that slurries of a high coal content make possible transport and combustion of coal in liquid form. By this a less risky and more environmentally adapted handling is achieved compared to the handling of dry, solid coal or oil. To make the coal-water slurry fluid at the concentration ranges in question chemicals have to be added. The dispersing agents previously used make the preparation of a dispersion of pulverized coal in water which can be pumped more expensive and thereby the use of the new technique more difficult. By means of the dispersing agent of the invention comprising polymerized fatty acids, polymerized rosin acids and/or optionally polymerized fatty or rosin acid derivatives, which have been partially esterified with a polyalkylene glycol or a monoester or monoether thereof, having a residual acid value higher than 3, that is having varying amounts of ionic groups, such a chemical can be produced at a low price, which is of great importance for a commercial utilization of coal-water slurries.

When the dispersing agent of the invention is used to disperse coal particles in water it is convenient to use the dispersing agent in an amount of 0.01–5%, preferably 0.05–2, and preferably 0.3–1%, based on the total weight. The particle size of the coal normally is mainly within the range 1–200 μm.

The invention is described in a more detailed way in the following examples, in which the stated percentages and proportions are based on the weight.

The dispersing characteristics of the reaction products prepared in examples 1–4 have been determined in the same way as the oil value for pigment (SIS 17 61 05); the stated value, however, defines the amount of coal particles which can be dispersed into a free flowing product. The following procedure is used; 1 g bituminous coal having a particle size distribution that more than 40% is within the range 60–90 μm, is weighed on a blasted glass plate. Water comprising 3% dispersing agent is added. The amount of aqueous phase which has to be added to make the coal-slurry free flowing in working the pulverized coal with a spatula is noted. The accuracy is ±0.5%.

The flow properties and the stability of the coal-water mixture (CWM), which are critical for the pumpability and storage durability thereof, are inter alia dependent on the way in which the mixture has been prepared. To obtain reproducible CWM-tests the following procedure has been used in examples 4–8.

The dispersing agent is swelled in water of 80° C. and then homogenized in an Ultraturrax mixer. Alkali is then added if desired. This liquid is added in portions to the pulverous coal, which consists of sieved particles which have passed through a mesh opening of 250 μm. The premixed CWM sample is disintegrated in a dissolver at 2000 r/min for 20 minutes.

The viscosity of these CWM samples was measured in a Brookfield viscosimeter, type LVF, No. 3 at 30 r/min. By this the apparent viscosity is obtained. The storage stability was measured by means of the following penetration test which discloses tendencies for aggregation and/or sedimentation in the CWM sample. A glass rod (2 g, φ 1.7 mm) is allowed to fall to the bottom in a CWM sample of a volume of 100 ml and a height of 173 mm and the time required is measured.

EXAMPLE 1

Heating of crude tall oil and partial esterification with polyethylene glycol.

Crude tall oil having the analysis data below (so called not distillable crude tall oil) is charged into a reactor provided with a mechanical stirrer and protective atmosphere. To the reactor was connected a short column to collect reaction water in the receiver belonging to it.

Analysis data:
Acid value=134
Rosin content=14%
Unsaponifiable=23%
Viscosity (20° C. Emila)=505 mPa.s The temperature of the crude tall oil was increased to 280° C. and retained for 2 hours, whereafter the viscosity was 1 400 mPa.s (20° C. Emila) and the acid value had declined 32 units to 102.

To this heated crude tall oil (105 g) polyethylene glycol of a molecular weight of 8000 (245 g) is charged. The temperature of the mixture was maintained at 280° C. for 2 hours. A 3% water solution of the reaction mixture can maximally disperse 68% coal.

Heating of crude tall oil and partial esterification with polyethyleneglycol can also be performed in one step. This will, however, give a somewhat inferior dispersing agent, maximum 67% coal in the slurry.

EXAMPLE 2

Heating of crude tall oil from the sulphite pulping process and partial esterification with polyethylene glycol.

The extractive material of the trees can be recovered also in producing pulp by the sulphite process. This so called sulphite anthraquinone process is reported in literature to give a tall oil of good quality. By ultrafiltration and evaporation a stream rich in extractive material (dry matter content 40%) can be obtained from the sulphite pulping process. This emulsion of water and extractive material from the wood can be broken by the addition of diluted acid and heating. The lipid phase which is separated then has an acid value of 63. By reaction thereof with polyethyleneglycol (molecular weight 8000) at 280° C. to an acid value of 8 a substance is obtained which when added to water (1% of the total mixture) makes it possible to disperse 69% coal and obtain a pourable slurry.

EXAMPLE 3

Heating of crude tall oil in the presence of $BF_3$ and partial esterification with polyethylene glycol.

Dehydrated crude tall oil (1660 g) having an acid value of 140, a rosin content of 29% and a viscosity of 115 mPa.s (50° C.) are charged into a reactor provided with a mechanical stirrer with protective atmosphere. The temperature of the crude tall oil is raised to 125° C. and $BF_3$-solution (20 g) is added. The mixture is kept at this temperature for 4 hours, and then the temperature is increased to 250° C. and the reaction mixture blown with water steam for 1 hour. 120 ml oil is taken away together with the steam. The reaction product so obtained has an acid value of 120 and a viscosity at 50° C. of 2 100 mPa.s. The boron-trifluoride solution has a content of 47% in diethylether.

The reaction can also be interrupted by addition of water without steam blowing. During these conditions the reaction mixture will, however, contain $BF_3$ residues. Fatty acids and rosin acids can also be treated in this way.

The table below shows the properties of different dispersing agents as to their ability to produce a coal-water slurry having a high coal content. All dispersing agents have been prepared by partial esterification with polyethyleneglycol (molecular weight 4000) at 280° C.

| Lipid part | Maximum coal content in the coal-water slurry (%) |
|---|---|
| $BF_3$-treated fatty acid | 66 |
| $BF_3$-treated rosin acid | 68 |
| $BF_3$-treated crude tall oil | 67 |
| Crude tall oil | 66. |

As a comparison it can be mentioned that distilled water can disperse about 50% coal in a flowing slurry. The addition of crude tall oil to the water in an amount of 1% (pH=7) has no positive effect on this. The effect of the length of the chain of the polyethylene glycol chain is also of importance for the function of the dispersing agent. Polymerized rosin acid has a capacity for dispersing maximum 68% when being reacted with polyethylene glycol of a molecular weight of 4000 while 70% coal in water can be dispersed if the polyethylene glycol chain is prolonged (molecular weight 8000).

Pure rosin acid being esterified with polyethylene glycol can disperse 69% coal and pure tall oil fatty acid esterified with polyethyleneglycol (molecular weight 8000) can disperse 61% coal in water at the most.

Pure fatty acid and polymerized fatty acid being esterified with polyethyleneglycol both give coal-water slurries of a short consistency, all other dispersing agents give a slurry of a smoother consistency.

EXAMPLE 4

Treatment of crude tall oil with multifunctional alcohol and acid and partial esterification with polyethylene glycol.

By adding multifunctional alcohol and acid to crude tall oil a viscosity increase is obtained. Tall oil having the analysis data according to example 1 (548 g) is charged in a reactor equipped as in example 1 together with Polyol PX (a product consisting of polyhydric alcohols having a functionality between 2 and 4, produced by Perstorp AB) (91 g) and maleic anhydride.

The mixture is kept at 230° C. until the acid value has declined to 34, the viscosity then being 5000 mPa.s (Emila 50° C.). To 105 g of the reaction mixture is added 245 g polyethylene glycol (molecular weight 8000) and the temperature is raised to 280° C. After 2 h the acid value of the mixture is 9 and a 3% water solution can disperse 70% coal.

An addition of amine to the dispersing agent also increases the amount of coal in the coal-water slurry. By adding 0.5% diethylene triamine to the dispersing agent which has been prepared above and maintaining the mixture for 1.5 h at 160° C. the coal-water slurry can disperse another 1%.

In the same way other multifunctional acids and alcohols can also be reacted with tall oil. Some examples follow below.

A common feature in all cases is that a polymerization has taken place and that the product after reaction at 280° C. with polyethylene glycol (molecular weight 8000) has a residual acid value.

| Additive to the crude tall oil | Viscosity of the polymerized crude tall oil (50° C.), MPa·s | Residual acid value of the polyethylene glycolester | Maximum amount of coal in free flowing coal $H_2O$ slurry with 1% dispersing agent |
|---|---|---|---|
| Trimethylol propane Trimellitic acid | 1 200 | 6 | 71 |
| Monopenta-erythritol Maleic anhydride | 4 700 | 7 | 69 |
| Trimethylol propane Maleic anhydride | 1 600 | 7 | 70 |
| Dipenta-erythritol Maleic anhydride | 40 000 | 6 | 71 |

The viscosity of a 70% C CWM prepared from 0.5% of the reaction of tall oil and trimethylol propane and trimellitic acid stated above is 270 mPa.s and the time for penetration, as defined above, is 14 s. after one week of storage.

Standoil boiling is a traditional way to increase the molecular weight. An ester of tall oil fatty acid and dipentaerythritol with a residual acid value of 9–11 having a viscosity (20° C., Höppler) of 300–500 mPa.s after standoil boiling has a viscosity of 3500–6500 mPa.s (20° C.). The viscosity of the reaction product of crude tall oil, trimethylol propane and maleic anhydride prepared above can in 2 h be increased from 1600 mPa.s to 14 500 mPa.s (50° C.) by standoil boiling at 272° C. under protective atmosphere. By air blowing the sample the same increase of viscosity can be accomplished but at a lower temperature, about 250° C.

EXAMPLE 5

Heating of crude tall oil in the presence of boric acid and partial esterification with polyethylene glycol.

Crude tall oil (800 g) having an acid value of 134, a rosin content of 14% is charged into a reactor provided with a stirrer and receiver for collecting water. The crude tall oil is dehydrated by raising the temperature to 185° C. and then cooled to 50° C. and 24 g boric acid is added. The mixture was heated to 270° C. and maintained at this temperature for 9 h, the viscosity of the oil having been increased from 80 mPa.s (50° C.) to 2250 mPa.s. During the heating of the crude oil tall a substantial molecular enlargement has taken place.

90 g of the product obtained and 210 g polyethylene glycol (molecular weight 8000) are charged into a reactor and heated. After 1 h at 280° C. the acid value of the mixture has decreased 3 units. Addition of 0.5% of this product to a 70% C CWM gives a slurry having a viscosity of 340 mPa.s and not forming a hard sediment after storing for 18 days.

EXAMPLE 6

Polymerizing crude tall oil in the presence of a cobalt catalyst and distillation of the product obtained followed by partial esterification with polyethylene glycol.

Dry crude tall oil (800 g) having an acid value of 141 and a rosin content of 30% as well as 0.1% cobalt catalyst (Co napthenate) are charged into a reactor and the mixture is kept at 270° C. for approximately 8 h. The viscosity then is 5500 mPa.s at 20° C. From this product 30% of the most volatile components are removed by distillation. After reaction with polyethylene glycol (molecular weight 8000) in the ratio 3:7 at 240° C. an additive for dispersing coal in water is obtained.

| Reaction time h | Acid value | Viscosity of 70% C CWM 0.5% additive mPa·s | Penetration time after 7d s |
|---|---|---|---|
| 0.75 | 32 | 3415 | >60 |
| 1.0 | 29 | 240 | 10 |
| 2.0 | 28 | 215 | 12 |

An additive prepared as above but from crude tall oil not being polymerized or distilled, gives a CWM which after 7 days has formed a sediment.

EXAMPLE 7

A dispersing agent was prepared from pitch obtained during distillation of fatty acids, mainly C-18 unsaturated. These fatty acids originate from a mixture of edible oils.

30% pitch (acid value=27) was reacted with 70% polyethylene glycol (MW=8000) at 280° C. for ½h. From this product a 70% C CWM containing 0.5% additive was prepared. This CWM has an apparent viscosity of 390 mPa.s and the time for penetration amounts to 8 seconds after 9 days.

EXAMPLE 8

Dimerizing of fatty acids improves the dispersing properties in the corresponding polyethylene glycol ester, compared to the monomer acid. Tall oil fatty acid (acid value 192) and dimerized fatty acid (acid value 193) respectively were reacted with polyethylene glycol (molecular weight 8000) by heating at 220°-250° C. in a ratio of 3:7. The reaction was followed by reduction in acid number and the ability of the reaction mixtures (0.5& w/w) to disperse 70% w/w coal in water as well as the stability of the slurry against sedimentation was examined. This example also shows that a polyethylene glycol with a dimer fatty acid in both chain ends has very good dispersing properties for coal in water.

| Tall oil fatty acid and polyethylene glycol (Mw 8000) | | |
|---|---|---|
| Acid value reduction of reaction mixture | Viscosity of slurry mPa·s | Penetration time s |
| 2.6 | 970 | >60 |
| 4.4 | 190 | >60 |
| 6.6 | 250 | >60 |
| 9.4 | 540 | >60 |
| 11* | — | — |

*Impossible to disperse in water.

| Dimerized fatty acid and polyethylene glycol (Mw 8000) | | |
|---|---|---|
| Acid value reduction of reaction mixture | Viscosity of slurry mPa·s | Penetration time s |
| 2.7 | 200 | >60 |
| 5.5 | 200 | 28 |
| 7.5 | 210 | 16 |
| 9.3 | 220 | 6 |
| 11 | 250 | 5 |
| 13 | 280 | 3 |

I claim:

1. A coal-water dispersion comprising coal particles dispersed in water and a dispersing agent in an amount of 0.01-5% by weight of the dispersion, wherein the dispersing agent is a partial ester of a dimeric, trimeric or oligomeric fatty acid-containing composition selected from the group consisting of:
   (a) a crude tall oil having been polymerized so that its viscosity at 50° C. has been at least doubled;
   (b) a polymerized fatty acid compound; and
   (c) a residue obtained in distilling fatty acids from fats or oil,
which composition has been partially esterified with a polyalkylene glycol compound having an average molecular weight of at least 4000 and mainly being composed of ethylene oxide units, said dispersing agent having a residual acid value higher than 3.

2. A coal-water dispersion according to claim 1, wherein the fatty acid-containing composition comprises fatty acid derivatives derived from fatty acids which have been reacted with a multifunctional alcohol and/or carboxylic acid.

3. A coal-water dispersion according to claim 1 comprising a partial ester of a polymerized crude tall oil as dispersing agent, wherein said dispersing agent has been obtained by heating the polyalkylene glycol compound with crude tall oil at a temperature of up to 280° C. for a sufficient period of time for the acid value to be reduced by at least 2 units.

4. A coal-water dispersion according to claim 3, wherein the most volatile components in the polymerized crude tall oil have been removed by distillation before the partial esterification.

5. A coal-water dispersion according to claim 1 comprising a partial ester of a polymerized fatty acid compound as dispersing agent, wherein the polymerized fatty acid compound is a dimeric, trimeric and/or oligomeric product obtained by polymerizing fatty acids.

6. A coal-water dispersion according to claim 5, wherein the fatty acid is a tall oil fatty acid.

7. A coal-water dispersion according to claim 1, wherein the polyalkylene glycol compound is an alkyl monoether of a polyalkylene glycol, the alkyl group having 1-5 carbon atoms.

8. A coal-water dispersion according to claim 1, wherein the polyalkylene glycol compound is a monoester of a polyalkylene glycol and a carboxylic acid R—COOH, wherein R is a hydrocarbon radical having 1-4 carbon atoms.

9. A coal-water dispersion according to claim 1, wherein the polyalkylene glycol compound has an average molecular weight of from 4,000 to 10,000.

10. A coal-water dispersion according to claim 1, wherein the polyalkylene glycol compound is polyethylene glycol.

11. A coal-water dispersion according to claim 1, wherein the dispersing agent content is from 0.3 to 1% by weight of the dispersion.

* * * * *